United States Patent Office 3,455,279
Patented July 15, 1969

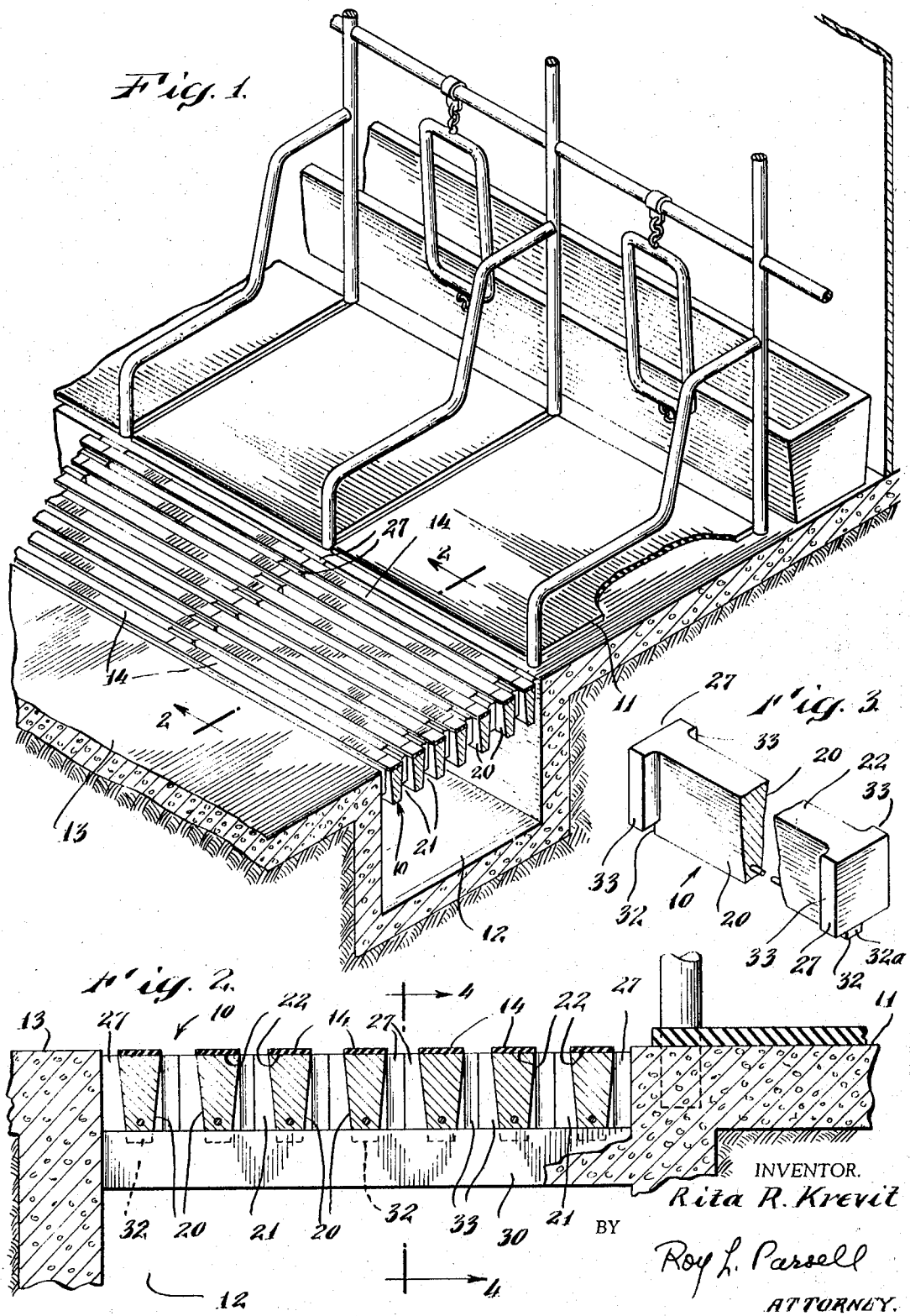

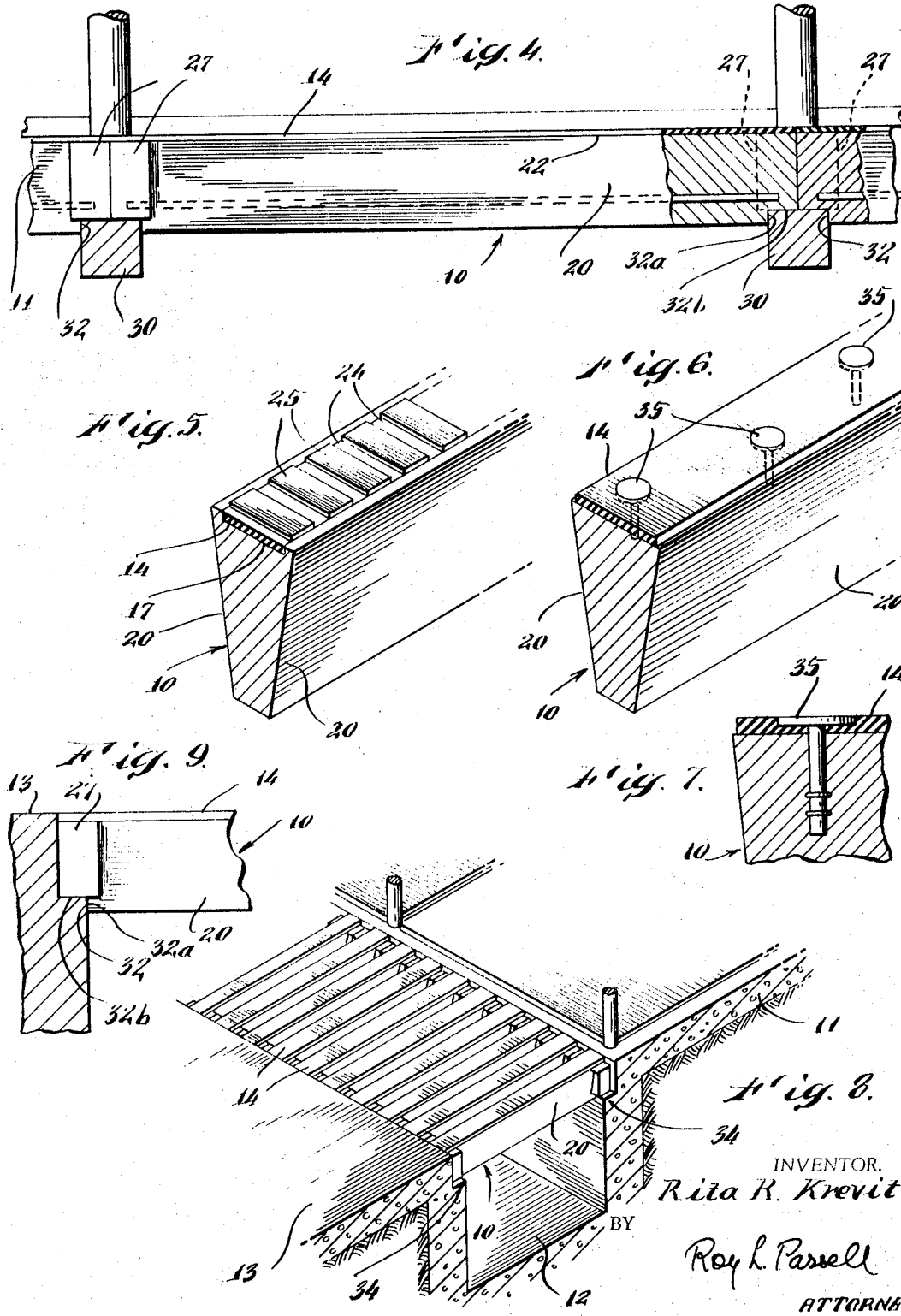

3,455,279
FLOOR MEMBER FOR ANIMAL BARN
Rita R. Krevit, 482 Alling Farm Road,
Orange, Conn. 06477
Filed Oct. 13, 1966, Ser. No. 586,492
Int. Cl. E01b *17/00;* A01k *1/00;* A01j *7/00*
U.S. Cl. 119—28          5 Claims

ABSTRACT OF THE DISCLOSURE

A removable unitary floor member known in the cattle industry as a "slat" is made of a precast material such as concrete for use in animal barns. Lateral spacing flanges provided with bearing surfaces of engaging foundation members and adjacent slats provide for supporting and maintaining the slat or slats in position. Resilient surfacing is incorporated in the top or floor face of the slat to minimize or prevent slippage.

---

This invention relates to floor structures for dairy and animal barns or the like and in particular to prefabricated floor members which can be installed at the building site.

For example modern dairy barns as now constructed provide, inter alia for a fluid manure handling system comprising essentially a drainage canal or deep gutter running along the rear of the platform or stalls where the animals stand. A current of water flows in the canal to a storage reservoir from which the liquid manure is pumped or otherwise transported to the fields to be fertilized.

Suitable openings must be provided for the manure to drop through and at the same time provide a suitable surface for the animals to walk on as they enter or leave the stalls to their stanchions.

Metal rod net work gratings have been used but they do not present an adequate floor suface for receiving the cloven hoofs of the dairy animals. The metal is subject to rapid corrosion and is expensive. The corrosion is not only unsanitary but weakens the metal structure and presents a hazard to life and limb. This requires expensive replacement as it would otherwise be a dangerous hazard to man as well as beast to say nothing of the inconvenience which often attends renewal.

It is therefore an object of my invention to provide a unitary member referred to as a "slat" in the industry which is easily installed initially and has nearly everlasting life.

Another object is to enable such members to be spaced at intervals to provide openings which permit the desired drainage yet provide a surface adjacent to the opening which will safely support the cloven hoof of the animal.

Still another object of my invention is to provide a member having a sufficient and resilient area which is engaged by a substantial or entire portion of the animal's hoof.

Yet another object of my invention is to provide a floor structural member which will prevent injury to the animal's feet such as foot rot, split hoofs and the like, which might cause a cancerous hoof condition.

Another object of my invention is to provide a structural member to prevent injury by slipping or falling which might result in udder injuries, swollen hocks or broken bones.

And another object of my invention is to provide a structural member which is easily cleaned per se or in its association with other structural means.

Another object of my invention is to provide a unitary member which can be prefabricated at the factory or other suitable manufacturing point and transported to the site or dairy barn for convenient placing in the desired position at the drainage canal gutter or providing a floor for a pen or stall.

Other objects and a fuller understanding of the invention may be had by referring to the following description and claims, taken in conjunction with the accompanying drawings in which:

FIGURE 1 is a perspective view of a portion of a dairy barn showing an appropriate installation of my invention;

FIGURE 2 is an enlarged vertical cross sectional view along line 2—2 of FIGURE 1;

FIGURE 3 is a perspective view of one of the unitary members or "slats" showing an embodiment of my invention without the pad on the top;

FIGURE 4 is a longitudinal elevation showing a unitary member installed in position;

FIGURE 5 is a sectional perspective view showing one embodiment of my invention;

FIGURE 6 is a sectional perspective view showing another embodiment of my invention;

FIGURE 7 is a sectional elevation in part of the invention shown in FIGURE 6;

FIGURE 8 is a perspective view of another type of installation of my invention; and FIGURE 9 shows the end portion of a unitary member of my invention mounted on a portion of a support member or gutter wall.

Referring now to the drawings, FIGURE 1 shows a group of slats 10 set in place behind the animal platform stalls 11 as a floor covering for the manure drainage gutter or canal 12. The slats 10 have spaces 21 about 2 inches wide to permit the manure to fall therethrough into the canal 12.

In my preferred embodiment I form the slats 10 of a concrete mixture having a top surface 22 about 4 inches wide and a length anywhere from approximately 2 feet to 6 feet with a thickness dependent on the length desired between supports for the necessary strength which thickness may vary from about four inches to six inches. Here again the thickness may depend on whether I use steel reinforcing rods (see FIGURE 3).

In the preferred embodiment the top surface 22 has mounted thereon a rubber pad 14 or other suitable resilient material to present a resilient surface to the animal's hoof or body should these slats be used as a floor in an animal stall or as a cover respectively for the gutter or canal.

My invention permits of a molding or precasting method of making the slat 10. For example a set of forms will provide that the slat may be cast upside down so that in one embodiment I might place the rubber pad 14 in the bottom of the mold with anchor pins 35 protruding upward and pour my concrete mix in on top of the pad 14 so that when the concrete sets the pins are well anchored in the concrete.

For anchor pins 35 I may use any non corrosive material such as copper, galvanized iron, or plastics such as nylon or the like.

Or in another embodiment I place the pad 14 which is now cut somewhat smaller than the bottom of the mold form, with or without the aforesaid pins 35 as desired, and spaced equally from all four sides so that when the casting is completed the pad 14 will appear as recessed into the concrete as the preferred embodiment.

I may also cast the slat 10 in an upright position and before the concrete sets add the pad 14 with or without the anchor means.

In another embodiment I pour the concrete without the pad so that the surface to receive the pad is a plane surface. Then I secure the pad 14 to the plane surface by means of a suitable cement such as epoxy resin, rubber cement or any of the available waterproof cements.

In still another embodiment I may form my pad 14 with anchoring projecting members which can be anchored in the concrete when it is poured.

To aid in the installation of my slat 10 in the dairy barn or animal stall, I cast my slats 10 with an enlarged end cross section 27 so that when the slats are placed side by side the opening space 21 therebetween will be of the necessary width for the passage of the manure yet will not permit the animal hoof to enter.

In the preferred embodiment of my invention I provide that the longitudinal sides 20 tend to converge downwardly so that the longitudinal top edge thus overhangs the corresponding bottom edge and any falling manure will not adhere to the sides or bottom edges of the slat.

In certain embodiments I may slope the border surface 23 slightly toward the outside edges to prevent any liquid standing on the border.

To both support the slat and prevent longitudinal movement when in place (see FIGURES 2, 3, 8 and 9) I provide a notch 32 (FIGURE 3) having a vertical surface portion 32a to engage the side of the support beam 30 (FIGURE 4) and a horizontal surface portion 32b (FIGURE 4) to engage the top of the beam 30.

To provide for lateral spacing between any pair of slats 10 or side wall (see FIGURES 2 and 3) I provide lateral spacing extensions or flanges 33 on each side of the slat at the ends of the slats 10. These spacing extensions or flanges 33 also extend downward (FIGURES 1 and 9) to the top 32b of the notch 32 as well as longitudinally toward the center of the slat 10 to overhang the edge of the support beam 30 to prevent manure from being caught on the edge of the support beam as it drops into the gutter 12.

This lateral extension or flanges 33 also prevents the slat 10 from tipping laterally due to its engaging an adjacent lateral extension 33 on an adjacent slat 10 or the side wall of the gutter 12 when that particular slat 10 is the last one in the group.

In placing the slats 10 in position I may spread a thin layer of cement (not shown) on the notch but this can be broken loose if it is desired to remove the slat for any reason.

As shown in FIGURES 1 and 2 I place my slats 10 parallel to the direction of the gutter 12 so that support beams 30 must be provided at convenient distance on which to rest the slats 10 which might vary from 4 to 6 feet or even more depending on the desired length and weight of the slat. It will be obvious that the width of the support beams should be such as to permit a portion of the spacing extension 33 to overhang the beam when the slat is in place so that the falling manure will not lodge on the beam (see FIGURES 8 and 9).

In FIGURE 8 I place my slats 10 transversely of the gutter 12 in which case a ledge 34 is provided in the side walls of the gutter on which to rest the ends of the slats. This ledge 34 obviously will stop just short of the spacing extension 33 to permit the latter to overhang the ledge 34 to prevent the falling manure from lodging thereon.

In using the term "concrete" I do not limit myself to the conventional material formed of a mixture of stone aggregate, siliceous material and cement but I may include in my mixture instead of stone aggregate such aggregates as cinder aggregates and vermiculite aggregates. Also I may include as aggregates the manufactured aggregates such as Haydite or Waylite which may include a sintered material. I may also include in my term concrete such admixtures as air entraining agents, waterproofing constituents and plasticizers.

In addition to the end extensions 33 spacing lateral of the slats 10 to provide for spacing 21 between the adjacent slats I may also use lateral extension intermediate the ends of the slats.

I do not limit myself to coverings for gutters or canals but I may use my slats as floors in general and stalls or the like for housing of animals.

I may also include in my resilient pad material distributed particles of friction material such as coarse sand or emery to provide against slipping.

I may also provide the top surface of my slat with a tread configuration to prevent slippage such as shallow channels 24 or corrugations which may run crosswise or lengthwise of this surface be it a pad formation or merely the precast concrete.

Although I have described my invention with a certain degree of particularity, it is understood that the present disclosure has been made only by way of example and that numerous changes in the details of construction and the comibnation and arrangement of parts may be resorted to without departing from the spirit and the scope of the invention.

I claim as my invention:

1. In an animal barn floor structure of the character employing a plurality of unitary slats supported on spaced foundation members disposed transversely of the slats; the improvement comprising a precast slat having a body portion, including a top face, opposite side faces depending therefrom, and a bottom face, the body portion terminating in enlarged end portions constructed and arranged with respect to the body portion, whereby to form a pair of co-planar, oppositely disposed lateral flanges at each end of said body portion, the flanges being normal to and disposed above a horizontal plane which includes the bottom face of the body portion, said flanges constituting combined lateral spacing means between successive adjacent slats and support means to maintain the slat in seated operative position on its associated foundation members against lateral and longitudinal displacement.

2. A slat in accordance with claim 1, wherein the top face comprises a resilient surface.

3. A slat in accordance with claim 2, wherein the resilient surface comprises a layer of resilient material recessed into the top face.

4. A slat in accordance with claim 2, wherein the resilient surface comprises a layer of resilient material having anchoring means protruding into the slat.

5. A slat in accordance with claim 1, wherein the top face is of a configuration comprising alternate ridges and channels whereby to prevent or minimize slippage.

References Cited

UNITED STATES PATENTS

| | | | |
|---|---|---|---|
| 1,259,802 | 3/1918 | St. John | 119—28 |
| 2,110,909 | 3/1938 | Henderson | 119—28 |
| 2,665,664 | 1/1954 | Benjamin | 119—28 |
| 3,137,270 | 6/1964 | Rigterink et al. | 119—16 |
| 3,148,663 | 9/1964 | Conover | 119—16 |
| 3,213,828 | 10/1965 | Sorensen | 119—20 |
| 3,228,376 | 1/1966 | Conover | 119—28 |

ALDRICH F. MEDBURY, Primary Examiner

U.S. Cl. X.R.

256—14